United States Patent
Shiralkar et al.

(10) Patent No.: US 9,002,836 B2
(45) Date of Patent: *Apr. 7, 2015

(54) SYSTEM FOR MANAGING ELECTRONIC ASSETS OF A SOFTWARE SERVICE DELIVERY ORGANIZATION

(71) Applicant: Accenture Global Services Limited, Dublin (IE)

(72) Inventors: Shreekant W. Shiralkar, Maharashtra (IN); Soumendra Mohanty, Maharashtra (IN); Deepali Dodamani, Maharashtra (IN); Nehal Baraiya, Maharashtra (IN)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/145,146

(22) Filed: Dec. 31, 2013

(65) Prior Publication Data

US 2014/0115143 A1 Apr. 24, 2014

Related U.S. Application Data

(63) Continuation of application No. 13/216,314, filed on Aug. 24, 2011, now Pat. No. 8,645,365.

(30) Foreign Application Priority Data

Feb. 9, 2011 (IN) .............. 371/CHE/2011

(51) Int. Cl.
*G06F 17/30* (2006.01)
*H04L 12/24* (2006.01)
*G06Q 10/06* (2012.01)

(52) U.S. Cl.
CPC ............. *H04L 41/50* (2013.01); *G06Q 10/063* (2013.01)

(58) Field of Classification Search
CPC .......... G06F 8/71; G06F 8/70; G06F 11/3616
USPC ....................................................... 707/695
See application file for complete search history.

(56) References Cited

U.S. PATENT DOCUMENTS

| | | |
|---|---|---|
| 7,849,018 B1 | 12/2010 | Warner |
| 2002/0065802 A1 | 5/2002 | Uchiyama |

(Continued)

OTHER PUBLICATIONS

"Jenni Innovation Process Management (IPM)", http://www.jpb.com/jenni/onetwothree.php, Downloaded Circa Dec. 23, 2009, pp. 1-2.

(Continued)

*Primary Examiner* — Rehana Perveen
*Assistant Examiner* — Alexander Khong
(74) *Attorney, Agent, or Firm* — Fish & Richardson P.C.

(57) ABSTRACT

An asset management system (AMS) facilitates management of electronic assets of a software service delivery organization. The AMS may facilitate classification of the electronic assets according to delivery phases in which each electronic asset is usable and accordingly enables users to identify and download the suitable assets usable in a desired delivery phase. The AMS also may receive from the users, usage data for (representing an extent of use of) the downloaded electronic assets and generate a set of utilization characteristics of the electronic asset based on the usage data. In addition, the AMS may facilitate classification of the assets according to a set of technology areas in which each electronic asset is applicable. On identifying that a new user is expected to operate in a specific technology area, the AMS may determine and provide suitable assets applicable to the specific technology area.

20 Claims, 11 Drawing Sheets

(56) References Cited

U.S. PATENT DOCUMENTS

| | | | |
|---|---|---|---|
| 2002/0091543 | A1 | 7/2002 | Thakur |
| 2003/0106039 | A1 | 6/2003 | Rosnow et al. |
| 2005/0097133 | A1* | 5/2005 | Pham et al. ............... 707/104.1 |
| 2005/0131971 | A1 | 6/2005 | James et al. |
| 2006/0048102 | A1* | 3/2006 | Wenger ........................ 717/130 |
| 2006/0136364 | A1 | 6/2006 | Hagedorn et al. |
| 2007/0021968 | A1* | 1/2007 | Amir et al. ........................ 705/1 |
| 2007/0168348 | A1* | 7/2007 | Forsyth ........................... 707/10 |
| 2009/0119572 | A1 | 5/2009 | Koivunen |
| 2010/0057520 | A1 | 3/2010 | Rejai |
| 2011/0302623 | A1 | 12/2011 | Ricci |

OTHER PUBLICATIONS

Ze-Sheng Wang, Ru-Zhi Xu, Kang-Kang Zhang and Da-Li Feng, "Design and Implementation of RAS-Based Reusable Asset Management Tool", IEEE year 2008 International Conference on Internet Computing in Science and Engineering, pp. 363-366.

Efthimios Bothos, Dimitris Apostolou and Gregoris Mentzas, "A Collaborative Information Aggregation System for Idea Management", IEEE Year 2008 The Third International Conference on Internet and Web Applications and Services, pp. 289-296.

Monish Das and Rajiv Puri, "Using Innovation Management for Cost Reduction in The automotive Industry", http://www.infosys.com/research/publications/Documents/cutting-edge-CE-07-03.pdf, Year Sep. 2003, pp. 1-4.

"Innovator Professional", http://www.us-mindmatters.com/products/standard_features.asp#Challenges, Downloaded Circa Dec. 31, 2009, pp. 1-4.

"A Blueprint for Better Management from the Desktop to the Data Center", http://www.novell.com/rc/docrepository/public/37/basedocument.2007-05-08.7328489951/A_Management%20Blueprint_WP_Final_03-07-07_en.pdf, Year Mar. 2007, pp. 1-17.

Shalaka Natu and John Mendonca, "Digital Asset Management Using a Native XML Database Implementation", Year Oct. 16-18, 2003, Lafayette, Indiana, USA.Copyright 2003 ACM, pp. 237-241.

"IBM Tivoli Asset Management for IT", http://www.maximo.ae/pdf/tammit.pdf, Downloaded Circa Dec. 23, 2009, pp. 1-6.

Halfawy, M.R., "Integration of municipal infrastructure asset management processes: challenges and solutions", http://www.nrc-cnrc.gc.ca/obj/irc/doc/pubs/nrcc48340/nrcc48340.pdf, A version of this document is published in / Une version de ce document se trouve dans:Journal of Computing in Civil Engineering, v. 22, No. 3, May/Jun. 2008, pp. 1-48.

Mordechai Ben-Menachem and Roy Gelbard, "Integrated IT management tool kit", Communications of the ACM Apr. 2002/vol. 45, No. 4, pp. 97-102.

"Spigit for SharePoint", http://www.spigit.com/products/s_index.html, Downloaded Circa Dec. 31, 2009, pp. 1-2.

"SAM Advantage", http://www.bsa.org/country/Tools%20and%20Resources/sam-advantage.aspx, Downloaded Circa Dec. 22, 2009, pp. 1-3.

U.S. Non-Final Office Action for U.S. Appl. No. 13/216,314 dated Jan. 3, 2013, 34 pages.

U.S. Final Office Action for U.S. Appl. No. 13/216,314 dated Jul. 5, 2013, 31 pages.

U.S. Notice of Allowance for U.S. Appl. No. 13/216,314 dated Sep. 20, 2013, 13 pages.

* cited by examiner

Asset Library - Searches

Advanced Search

Technology Group: ☐ SAP  ☐ PeopleSoft  ☐ C  ☐ BI  ☐ JAVA  ☐ C++
Sub Technology1: Data Management and Architecture ▽   Sub Technology2: -Select- ▽
Application Area: Deployment ▽   Classification: -Select- ▽
Asset Group: Delivery Excellence ▽   Growth Platform: -Select- ▽
Asset Type: -Select- ▽   Asset Names: 560

[Search] 570

Total Counts: 5
**Multiple files can be downloaded in a single zip file   ☑ Restricted   [Download]   [Add Columns]

| **Select to Download | Technology Group | Asset Name | Asset Type | Application Area | SW QA | Maturity Score (0-4) | Description | Feedback |
|---|---|---|---|---|---|---|---|---|
| ☐ | Oracle | AOLAutomate 1.1.zip | Accelerators | Deployment | SI | 1.63 | AOL Application object library | |
| ☑ R | Oracle | Sybase to Oracle | Knowledge | Deployment | SI | 0.0 | This is a restricted asset | 1 |
| ☐ | C | DataStage Using C,C++ APIs.zip | Reusable Codes | Deployment | SI | 1.88 | Data Stage API | |
| ☐ R | PCM | Content Migration | Knowledge | Deployment | SI | 2.5 | This is a restricted asset | 1 |
| ☐ | SAP | Licence key Monitor.zip | Configuration | Deployment | SI | 0 | Licence Monitor | |

Asset Library - Utilization

Top Asset Usage Tracking

Rank Number: 1   [Search]

Export To Excel

Row Count : 16

| Asset Ranking | Technology Area | Asset Name | Project Name | Effort Saved (Hrs) | Dollars Saved |
|---|---|---|---|---|---|
| 1 | BI | BO Universe Automation Tool.zip | Media Project | 34 | 1176 |
|   |    |    | Health Care Project | 50 | 1164 |
|   |    |    | Accenture - Milan Project | 34 | 2352 |
|   |    |    | Banking Project | 168 | 8820 |
|   |    |    | Accenture International | 101 | 3528 |
|   |    |    | Large Retail Project | 84 | 2940 |
| 6 | BI | BusinessObjects Report Analyszer Tool (BORAT).zip | Pilot for Large FinanceGroup | 0 | 0 |
|   |    |    | Pilot for Retail Group | 0 | 0 |
| 5 | BI | Reverse Engineered Deski Report.zip | Finance Group - Letters | 89 | 3112 |
| 2 | PCM | Enterprise iContent Migration Tool.zip | Large Retail Project | 1535 | 28971 |
|   |    |    | Consumer Project | 1535 | 28971 |
|   |    |    | Large Pharmaceutical Medical Repository | 960 | 25000 |

761 (Technology Area) · 762 (Asset Name) · 763 (Project Name) · 764 (Effort Saved) · 765 (Dollars Saved)

Asset Library - Recommended Asset Search

Capability Recommended Assets - BI (Business Intelligence) ← 920

Technology assets Recommended by asset managers to be used by projects.

**Multiple files can be downloaded in a single zip file  [R] Restricted

[Download] [Add Columns]  950

| **Select to Download | Technology Group | Asset Name | Asset Type | Application Area | SV QA | Maturity Score (0-4) | Feedback |
|---|---|---|---|---|---|---|---|
| ☑ | BI | BBI to Database Design.doc | Knowledge Assets | Plan | SI | 1.63 | 1 |
| ☐ [R] | BI | A DataStage Application Using CC++ APIs.zip | Reusable Codes | Build | SI | 0.61 | |
| ☑ | BI | A DWfor Website Click Stream Analysis.ppt | Knowledge Assets | Analyze | SI | 1.56 | 1 |
| ☐ | BI | Ab Initio Code Review Tool and Presentation.zip | Project Review Tools | Build | SI | 2.99 | |
| ☐ | BI | Ab Initio cookbook.doc | Knowledge Assets | Build | SI | 1.56 | 1 |
| ☐ [R] | BI | Ab Initio Estimation.xls | Estimation Tool | Plan | SI | 2.99 | |
| ☐ | BI | Ab Initio graph analyzer.zip | Estimation Tool | Plan | SI | 2.98 | 1 |
| ☐ | BI | Ab Initio Licence key monitor.zip | Configuration | Build | SI | 0 | |

SYSTEM FOR MANAGING ELECTRONIC ASSETS OF A SOFTWARE SERVICE DELIVERY ORGANIZATION

CROSS-REFERENCE TO RELATED APPLICATION

The application is a continuation (and claims the benefit of priority under 35 USC 120) of U.S. application Ser. No. 13/216,314, filed Aug. 24, 2011, which claims the benefit of Indian Patent Application No. 371/CHE/2011, filed on Feb. 9, 2011. Both of these prior applications are incorporated herein by reference in their entirety for all purposes.

FIELD

The present disclosure relates to software service delivery, and more specifically to a system for managing electronic assets of a software service delivery organization.

BACKGROUND

Software service delivery (SSD) refers to the process of developing, deploying and maintaining software programs for different business entities. In general, a software service organization sells its software services to some of the business entities (hereafter referred to as "customers"), who then provide corresponding desired business requirements. The software service delivery organization develops one or more software programs for each of the customers (meeting their provided requirements) and then deploys and maintains the developed software programs at different customer sites (or at a common site, using resources dedicated for each customer), thereby enabling the customers to operate according to their desired business requirements.

Electronic assets are often used by organizations for SSD. Electronic assets are characterized in that they are represented in the form of data (bits) and are thus reusable in different phases (such as development, testing, deployment, maintenance, etc.) of SSD. Examples of electronic assets include software modules (which can be incorporated into the deployed software programs), documents (e.g., in the form of PDF, MS-word files) detailing the best practices as applicable to specific phases, software automation tools that assist in faster delivery of software services, training material to be provided to the employees of the SSD organization, etc.

Several aspects of the instant disclosure facilitate the management of such electronic assets of a SSD organization as described in below sections.

SUMMARY

According to an aspect of the instant disclosure, an asset management system facilitates creating an electronic asset based on a set of ideas, classifying the electronic asset according to a set of delivery phases in which the electronic asset is usable, and uploading the electronic asset into an asset repository. The asset management system also maintains a catalog identifying which of the set of delivery phases in which each of the electronic assets in the asset repository is usable (the catalog being consistent with the classification performed with respect to the electronic asset) and provides a search tool for users to search the catalog for electronic assets usable in a desired delivery phase. Users are accordingly enabled to search the catalog to identify a set of suitable assets using the search tool based on the desired delivery phase, to download the set of suitable assets from the asset repository and to use the downloaded suitable assets in delivering software services.

In some implementations, the creation of the electronic assets is performed by requiring users to submit ideas to an idea management system, checking periodically the ideas submitted to the idea management system to determine ideas related to software service delivery, identify a set of ideas as being related to software service delivery based on the checking and selecting the set of ideas for development into an electronic asset.

Another aspect of the instant disclosure facilitates subject matter experts (SMEs) to provide a ranking for each of the assets in the asset repository and also to recommend specific electronic assets for each of the set of delivery phases. The catalog accordingly maintains the ranking and recommendations associated with each of the electronic assets, with the search tool then including the maintained rankings and/or recommendations in the search results.

Yet another aspect of the instant disclosure facilitates SMEs to associate a maturity score with each of the assets in the asset repository, the maturity score indicating an order of preference of use of the assets. The catalog may accordingly maintain the maturity scores corresponding to the different assets, and the search tool may include the maturity score in the search results.

Thus, the users of the asset management system are enabled to better identify the set of suitable assets (for downloading) based on the rankings, recommendations and/or maturity scores included in the search results.

One more aspect of the instant disclosure facilitates monitoring of a corresponding number of assets downloaded by each of the users from the asset repository, determining that the corresponding number of assets downloaded by a first user is more than a threshold and notifying an asset manager of the number of assets downloaded by the first user in response to the determining.

Another aspect of the instant disclosure facilitates asset managers to tag some of the electronic assets in the asset repository as restricted assets, where the asset management system is designed to notify the respective asset managers in response to a user trying to download a restricted asset from the asset repository. A user may be enabled to download the restricted asset only on receiving an authorization from the respective asset managers.

According to yet another aspect of the instant disclosure, the asset management system facilitates creating an electronic asset based on a set of ideas, uploading the electronic asset into an asset repository, and enabling users to download a suitable electronic asset from the asset repository and to use the suitable electronic asset in delivering software services. The asset management system is designed to receive, from the users, usage data for the downloaded suitable electronic asset, the usage data representing an extent of use of the suitable electronic asset in delivering software services and to generate a set of utilization characteristics of the suitable electronic asset based on the usage data.

According to yet another aspect of the instant disclosure, the asset management system facilitates classification of each of the electronic assets (sought to be uploaded to the asset repository) according to a set of technology areas in which the electronic asset is applicable, and maintains a catalog identifying which of the set of technology areas to which each of the electronic assets in the asset repository is applicable (based on the classification). The asset management system, based on identifying a new user (such as an employee newly inducted into the software service delivery organization) and a technology area in which the new user is expected to operate in delivering software services, inspects the catalog to determine a set of suitable assets for the technology area and provides information on the determined set of suitable assets to the new user.

BRIEF DESCRIPTION OF THE DRAWINGS

Example implementations will be described with reference to the accompanying drawings briefly described below.

FIG. 5B depicts the manner in which users are enabled to search for electronic assets based on keywords.

FIG. 7 depicts the manner in which utilization metrics of electronic assets is provided.

FIG. 9 depicts the manner in which assets related to a technology group (in which a new user is expected to operate) are provided to the new user.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Several aspects of the instant disclosure are described below with reference to examples for illustration. However, one skilled in the relevant art will recognize that the teachings of the instant disclosure can be practiced without one or more of the specific details or with other methods, components, materials and so forth. In other instances, well-known structures, materials, or operations are not shown in detail to avoid obscuring the features of the instant disclosure. Furthermore, the features/aspects described can be practiced in various combinations, though only some of the combinations are described herein for conciseness.

1. Example Environment

Figure 1:
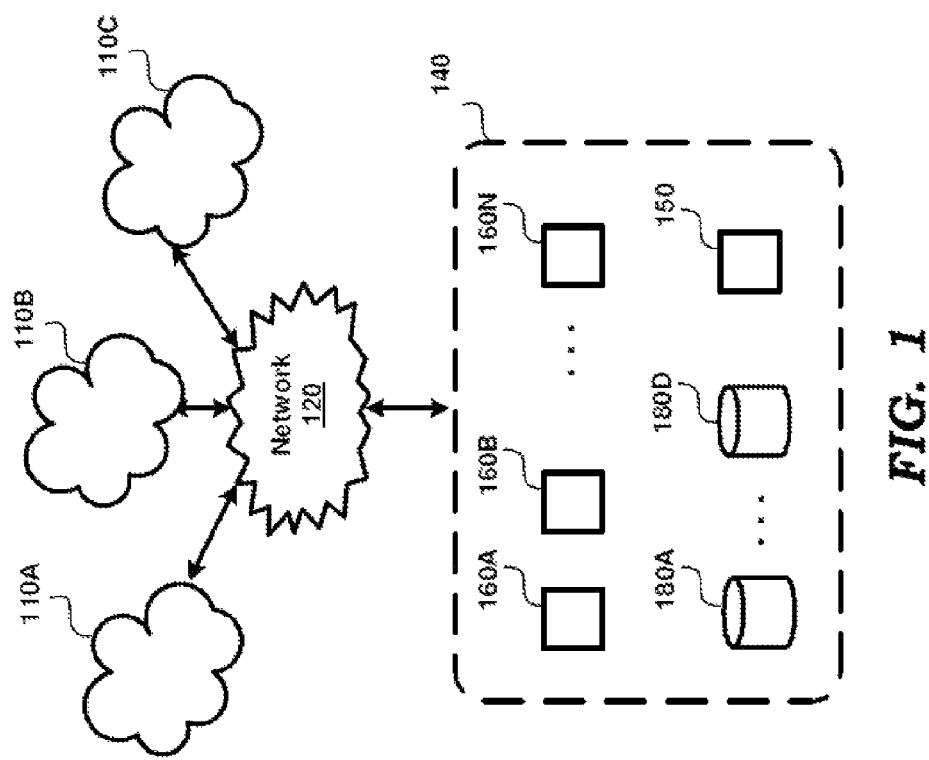
FIG. 1 is a block diagram illustrating the details of an example environment (or computing system) in which several aspects of the instant disclosure can be implemented.

FIG. 1 illustrates an example environment (or computing system) in which several aspects of the instant disclosure can be implemented. The computing system includes customer sites 110A-110C, network 120, and software service delivery (SSD) organization 140. The SSD organization 140 includes asset management system 150, user systems 160A-160N, and data stores 180A-180D).

Merely for illustration, only representative number/type of systems and locations is shown in FIG. 1. Environments often include many more systems, both in number and type, depending on the purpose for which the environment is designed. Each component/block of FIG. 1 is described below in further detail.

Each of customer sites 110A-110C represents a group of systems (such as server systems, data stores, etc.) designed to host software programs which, on execution, facilitate the operation of the corresponding customer according to desired business requirements. Each customer site may include other systems that may be used by employees of the customer organization to perform various tasks (e.g., by sending corresponding requests to the software programs hosted on the server systems) as part of the business operations.

Network 120 provides connectivity between the systems in customer sites 110A-110C and the systems in SSD organization 140, such as asset management system 150, user systems 160A-160N and data stores 180A-180D. Network 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the TCP/IP address assigned to the source system from which the packet originates and the destination address set to the TCP/IP address of the target system to which the packet is to be eventually delivered.

SSD organization 140 depicts some of the systems that may be used in delivering software services to different customers. Each of user systems 160A-160N represents a system such as a personal computer, workstation, mobile station, etc., used by users (such as managers developers, testers, etc. from the same or different technical, functional, operational or industry groups) to work together for delivering software services. In particular, the user systems may be used (by developers) to develop/test software programs for a customer and to deploy and maintain the software programs in the server systems/data stores in the corresponding customer site (e.g., 110A-110C).

Each of user systems 160A-160N may execute different applications (such as a programming language compiler, test runner, etc.) that facilitate users to perform the various tasks forming part of the different phases (develop, test, deploy, maintain, etc.) of SSD in delivering the software programs for the customers. Furthermore, some of the user systems may operate as servers (such as application servers, testing servers, etc.) executing applications shared by different users, and accordingly user systems may be designed to communicate with such servers for performance of the tasks.

Each of data stores 180A-180D represents a non-volatile storage facilitating storage and retrieval of a collection of data by applications executing in user systems 160A-160N (typically while processing user requests) and also asset management system 150. Some of the data stores may be implemented using relational database technologies and therefore provide storage and retrieval of data using structured queries such as SQL (Structured Query Language). Other data stores may be implemented as file stores providing storage and retrieval of data in the form of one or more files organized as one or more directories, as is well known in the relevant arts.

Thus, the various systems of SSD organization 140 are together used in delivering software services to the various customers (e.g., operating customer sites 110A-110C). Only a few representative systems and customer sites are shown in FIG. 1 for illustration. However, in a typical scenario, the number of users of SSD organization 140 may be very large (e.g., in the range 1000-10000) and may be divided into multiple groups/teams based on geographical locations, SSD phases, customers, etc. The number of customers/customer sites may similarly be large (e.g., in the range 50-100).

Such a large number of users/customers may result in duplication of work/effort (in terms the human resources, infrastructure, time, etc. spent by SSD organization 140) in delivering the same/different software services to the various customers. The duplication of work/effort may be partially reduced by re-using electronic assets in the form of software modules, documents, tools, etc. during the different phases of SSD.

There are several challenges in using electronic assets during SSD, in particular for large SSD organizations where the number and/or type of electronic assets are substantially large and/or different. One challenge (faced by users) is the identification of the specific assets to be used based on specific phase of the SSD, the software program being developed for the customer, the specific software/operating system platforms used in the customer sites, etc. Another challenge (faced by managers) is the determination of the effectiveness (e.g., in terms of re-use) of the electronic assets in delivering the software services to the customers. Yet another challenge is the determination of the specific assets that are to be replaced, revised or retired (not to be further re-used). Furthermore, sustaining the use of electronic assets by the users of SSD organization 140 may pose other challenges.

Asset management system 150, provided according to several aspects of the instant disclosure, facilitates management of electronic assets of a software service delivery organization and may address some of the challenges noted above. In particular, asset management system 150 may enable the productivity of users to be raised (e.g., by re-use of the assets) and may reduce the time taken to deliver the software services to the customers. The manner in which asset management system 150 facilitates creation of electronic assets and then maintains the electronic assets is described below with examples.

2. Creating and Maintaining Electronic Assets

Figure 2:
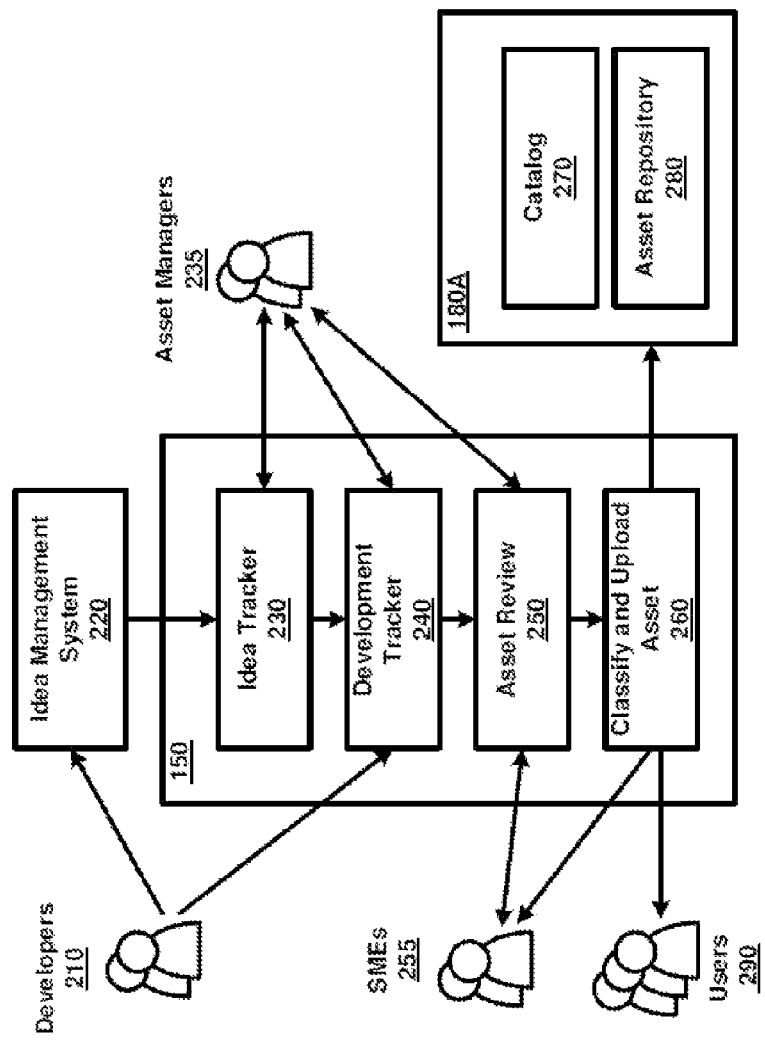
FIG. 2 is a block diagram illustrating the manner in which electronic assets are created and maintained (in an asset repository) according to an aspect of the instant disclosure.

FIG. 2 illustrates the manner in which electronic assets are created and maintained (in an asset repository) according to an aspect of the instant disclosure. Each of the blocks is described in detail below.

Asset repository 280 represents a non-volatile/persistent storage used to store electronic assets of a software service delivery (SSD) organization. The electronic assets may be stored in any convenient manner based on the type of asset, as will be apparent to one skilled in the relevant arts. For example, the instructions forming reusable software modules and/or documents may be maintained as such (in their entirety or portions thereof) in asset repository 280, while automation tools may be stored externally on another storage and only their storage locations may be maintained in asset repository 280.

Catalog 270 represents a non-volatile/persistent storage used to maintain information regarding the assets uploaded to asset repository 280. The information maintained may include the delivery phases in which an electronic asset is usable, the type of the asset, the technologies to which the asset is applicable and the service lines where the assets can be used.

Catalog 270 and asset repository 280 are shown as being part of data store 180A for convenience. However, in some implementations, the various non-volatile/persistent storages (including those described below such as utilization metrics 640) may be implemented together or separately in different data stores (180A-180D) present within SSD organization 140. For example, the electronic assets may be divided based on the different technical, functional, operational or industry groups and stored in corresponding different data stores. In some examples, data store 180A corresponds to a database server implemented according to relational database technologies (e.g. SQL Server available from Microsoft™ Corporation), with each of catalog 270, asset repository 280, and utilization metrics 640 corresponding to one or more tables/databases within the database server.

Each of developers 210, asset managers 235, and subject matter experts (SMEs) 255 represent groups of users performing corresponding roles (as developer, manager, expert, etc.) in the software service delivery organization 140. Users 290 represent the superset of users/employees of SSD organization 140 and include the other sets of users such as developers 210, asset managers 235, SMEs 255, etc. When a group of users is shown (by the corresponding arrows) as interacting with asset management system 150, the same individual user or different individual users belonging to the group may be performing the different interactions. Furthermore, though only a single group of each role is shown as performing all the interactions, it may be appreciated that SSD organization 140 may have multiple groups for each role, with the different groups performing different interactions with the asset management system.

Idea management system 220 represents a system (external to asset management system 150) that facilitates developers 210 of SSD organization 140 to submit new ideas/concepts (hereafter referred to together as "ideas") related to the organization. For example, developers 210 (using one of user systems 160A-160N) may specify the details of the ideas using appropriate user interfaces provided by idea management system 220. The submitted ideas may be related to different areas, such as for improving the physical environment of the organization, for reducing the commuting time, for software service delivery (SSD), etc. The details of the submitted ideas may be maintained in a non-volatile storage associated with idea management system 220.

Asset management system 150, for instance, is designed to monitor the ideas submitted to idea management system 220 and to create electronic assets based on the submitted ideas. Asset management system 150 includes various executable modules such as idea tracker 230, development tracker 240, asset review 250, and classify and upload asset 260. Each of the modules is described in detail below.

Idea tracker 230 is designed to monitor the ideas submitted to idea management system 220 and to identify and select the specific ideas that are related to software service delivery for development into corresponding electronic assets. In some implementations, each of developers 210 associates with each submitted idea, corresponding attributes selected from a pre-configured set of attributes (for example, "A", "B", "C", etc.) provided by idea management system 220. The selected attributes are then stored associated with the submitted idea (for example, in the non-volatile storage). Idea tracker 230 is designed to check for those ideas which are associated with specific attributes (for example, "A") that are deemed to be related to SSD, and to identify ideas associated only with the specific attributes. The checking of the submitted ideas may be performed periodically, for example, at the end of each day.

In some examples, idea tracker 230 may select all the identified ideas for development into electronic assets. In other examples, idea tracker 230 notifies (one or more) asset managers 235 of the list of identified ideas (associated with the specific attributes), and asset managers 235 then select the specific ideas to be developed into electronic assets. Idea tracker 230 may then forward the selected ideas to development tracker 240.

Development tracker 240 is designed to track the development of the selected ideas into the corresponding electronic assets. Accordingly, development tracker 240 may be designed to keep track of the start date, the probable end date, the developers assigned, the current development status, the effort estimated/spent (in terms of man-days), etc. corresponding to each of the selected ideas being developed into electronic assets.

The development of the assets for different ideas may require different number/types of resources, in terms of developers (210), infrastructure, time, etc. Accordingly, the selected ideas are allocated appropriate resources for development and development tracker 240 keeps track of the allocated resources such as the developers assigned, time, etc. The development of the assets may be performed by the same developer(s) who submitted the corresponding idea to idea management system 220, by different developer(s) or by a combination of both.

Development tracker 240 then keeps track of the development progress of the electronic asset to identify when the development of the electronic assets are completed. For example, development tracker 240 may receive and maintain the current development status (such as "Queued", "On Hold", "In progress", "Completed", etc.) of each of the electronic assets from the developers (210) assigned to the corresponding selected ideas. Development tracker 240 may then check for each electronic asset whether the corresponding current development status indicates completion (e.g., is set to "Completed"). Development tracker 240 may then forward the electronic assets that are completed to asset review 250.

Asset review 250 receives the electronic assets that are identified as completed (by development tracker 240) and then forwards the details of the received assets to SMEs 255. In some implementations, asset managers 235 interact with the development tracker 240 to monitor the development progress of each of the electronic assets. On determining that the development of an asset is completed, an asset manager assigns specific SMEs to review the completed asset.

SMEs 255 then provide qualitative (such as writing a brief description of the positive/negative features of the asset) and/or quantitative (such as a score from 1 to 10, with 10 indicating best) reviews of the completed assets to asset review 250. Asset review 250 may then determine whether each of the completed electronic assets is acceptable for inclusion in asset repository 280, based on their corresponding review. For example, asset review 250 may forward the reviews received from the various SMEs 255 to asset managers 235, who may then approve the specific electronic assets to be uploaded to asset repository 280. Asset review 250 then forwards only the approved assets to be included in asset repository 280 to classify and upload asset 260.

Classify and upload asset 260 classifies each of the electronic assets (approved for inclusion in asset repository 280) received from asset review 250 according to a set of delivery phases in which the electronic asset is usable. Broadly, the set of delivery phases is related to development, testing, deployment, maintenance, etc. of the software programs provided to the customers. Examples of specific values of delivery phases according to which electronic assets may be classified are shown in Table 1.

TABLE 1

Delivery Phases of SSD
Delivery Phases

| | | |
|---|---|---|
| Analyze | Coding Standards | Training On Testing |
| Build | Application testing | Project Management |
| Testing | Impact Analysis | Productivity |
| Planning | Estimation | Improvement |
| Design | Testing and Support | Portal |
| Deploy | Production | Test Strategy Creation |
| Code | Methodology | Test Data In Any Testing |
| BrownBag Session | Entire Project Life Cycle | Business process |
| Project Design and Business Blue Print | Test management. Regression Test Configuration White Paper | Management Performance Tuning Mainframes Reengineering applications |

The approved electronic assets may also be classified/categorized based on one or more of a set of asset types, a set of technology areas, and a set of service lines. Some example values for asset types are shown in Table 2, while that for technology areas is shown in Table 3. Sample values for service lines include, but are not limited to, software integration (SI), application outsourcing (AO), infrastructure outsourcing (IO), mainframes, etc.

TABLE 2

Asset Types

| Asset Type | Purpose | Description |
|---|---|---|
| Knowledge Assets | Reuse | Assets that are useful information on both functional and technical areas of any technology. |
| Training/Induction Packs | Reuse | Assets built around end to end training of modules or sub-modules to use for training programs and project induction for orientation to technology. |
| Configuration | Reuse | Assets with details on configuration steps |
| Best Practices | Reuse | Technology and Project Management best practices. |
| Knowledge Transition | Reuse | Specific Tools developed to augment the Knowledge Transition for technology areas. |
| Due Diligence Kit | Reuse | Kits developed to support due diligence. |
| Reusable Codes | Reuse | Collated repository of codes already implemented and extracted to make it applicable for similar business cases or functional design requirements with minimal changes and that can be reused in multiple projects of similar nature. |
| Accelerators | Reuse | Technology Tools and Methods that help in reducing the life cycle of a development or implementation by jump start or automation. |

TABLE 2-continued

Asset Types

| Asset Type | Purpose | Description |
|---|---|---|
| Applications | Reuse | Repository of specific non-standard custom applications developed in different projects to cater to the technology needs |
| SME Tools | Reuse | Tools to help experts, leads and SMEs to review application, codes and configurations from technology point of view. |
| Estimation Tools | Reuse | Customized Job Aids for effort and schedule estimation that evolved for a specific project need to resolve the given problem/complexity. |
| Project Review Tools | Reuse | Tools to help experts, leads and SMEs to review Overall Projects and its phases from technology point of view. |
| Productivity Improvement Tools | Reuse | Job Aids that help improve the productivity of resources by tracking, bug fixing, self review etc |
| Others/Miscellaneous | Others | Anything that is not covered in above categories |
| Reusable Codes | Automation | Collated repository of codes already implemented and extracted to make it applicable for similar business cases or functional design requirements with minimal changes and that can be reused in multiple projects of similar nature. |
| Accelerators | Automation | Technology Tools and Methods that help in reducing the life cycle of a development or implementation by jump start or automation. |
| Applications | Automation | Repository of specific non-standard custom applications developed in different projects to cater to the technology needs |
| Productivity Improvement Tools | Automation | Job Aids that help improve the productivity of resources by tracking, bug fixing, self review etc |
| Productivity/Metrics | Quality/Metrics | Technology relevant Quality/Productivity metrics which will help in articulating and coming out with a view around our benchmark on development metrics |
| Industry Solutions | Specialization | Industry specific solutions which helps in Sales/Delivery |
| New Tech PoV/PoC | Specialization | New Technology Point of Views and Proof of Concepts |

TABLE 3

Technology Areas

| Technology Group | Sub Technology1 | Sub Technology2 |
|---|---|---|
| Technology Consulting | Others | DCT |
| Technology Consulting | Microsoft[TM] Installer | WTC |
| Technology Consulting | Java[TM] | PE |
| Technology Consulting | Mainframe/COBOL[TM] | AR |
| Technology Consulting | Lotus Notes[TM] | WTC |
| Business Intelligence | ETL | Datastage |
| Business Intelligence | ETL | Informatics[TM] |
| Business Intelligence | ETL | BODI |
| Business Intelligence | ETL | Hyperion[TM] |
| Business Intelligence | OLAP | Business Objects |
| Business Intelligence | OLAP | SAS |
| Business Intelligence | Database | Sybase[TM] |
| Business Intelligence | Database | TeraData[TM] |
| Business Intelligence | Database | DB2[TM] |
| Business Intelligence | Data Management and Architecture | Data Quality |
| Business Intelligence | DW BI Methodology | General |
| Business Intelligence | DW BI Methodology | Data Quality |
| Business Intelligence | DW General Concepts | Data Modeling |
| Business Intelligence | DW General Concepts | DW Tools Comparison |
| Business Intelligence | DW General Concepts | Database Design |
| Business Intelligence | DW General Concepts | Datastage |
| C++[TM] | — | — |
| DCS[TM] | — | — |
| HostCentric[TM] | — | — |
| Java[TM] | — | — |
| Oracle[TM] | — | — |
| PCM[TM] | — | — |
| PeopleSoft[TM] | — | — |
| SaaS[TM] | — | — |
| SAP[TM] | — | — |
| Siebel[TM] | — | — |
| WS and I | — | — |

The same electronic asset may be classified into different delivery phases and into different combinations of the asset types, technology areas, and service lines. In some implementations, classify and upload asset 260 classifies the approved electronic assets based on the attributes specified by developers 210 for the corresponding ideas (in idea management system 220) or the assets themselves (in development tracker 240). Alternatively, the classification may be performed by SMEs 255 as part of review process or by other users such as asset managers after determining the approved electronic assets.

Classify and upload asset 260 uploads the approved and classified electronic assets to asset repository 280, and then updates catalog 270 to indicate the delivery phases in which each of the electronic assets uploaded to asset repository 280 is usable. Catalog 270 is updated consistent with the classification of the electronic assets. Classify and upload asset 260 may then notify users 290 (e.g., by sending emails) of the assets that have been successfully uploaded to asset repository 280. SMEs 255 may similarly be notified to enable to them to verify whether only the approved assets have been uploaded into asset repository 280. Thus, asset repository 280 maintains the uploaded electronic assets approved for re-use during software service delivery (with catalog 270 maintaining the information regarding the uploaded assets).

Thus, asset management system 150 facilitates the creation and maintenance (in asset repository 280) of the electronic assets of a software service delivery organization. The manner in which users are enabled to search and download the uploaded assets for reuse is described below with examples.

3. Searching and Downloading Electronic Assets for Reuse

Figure 3:
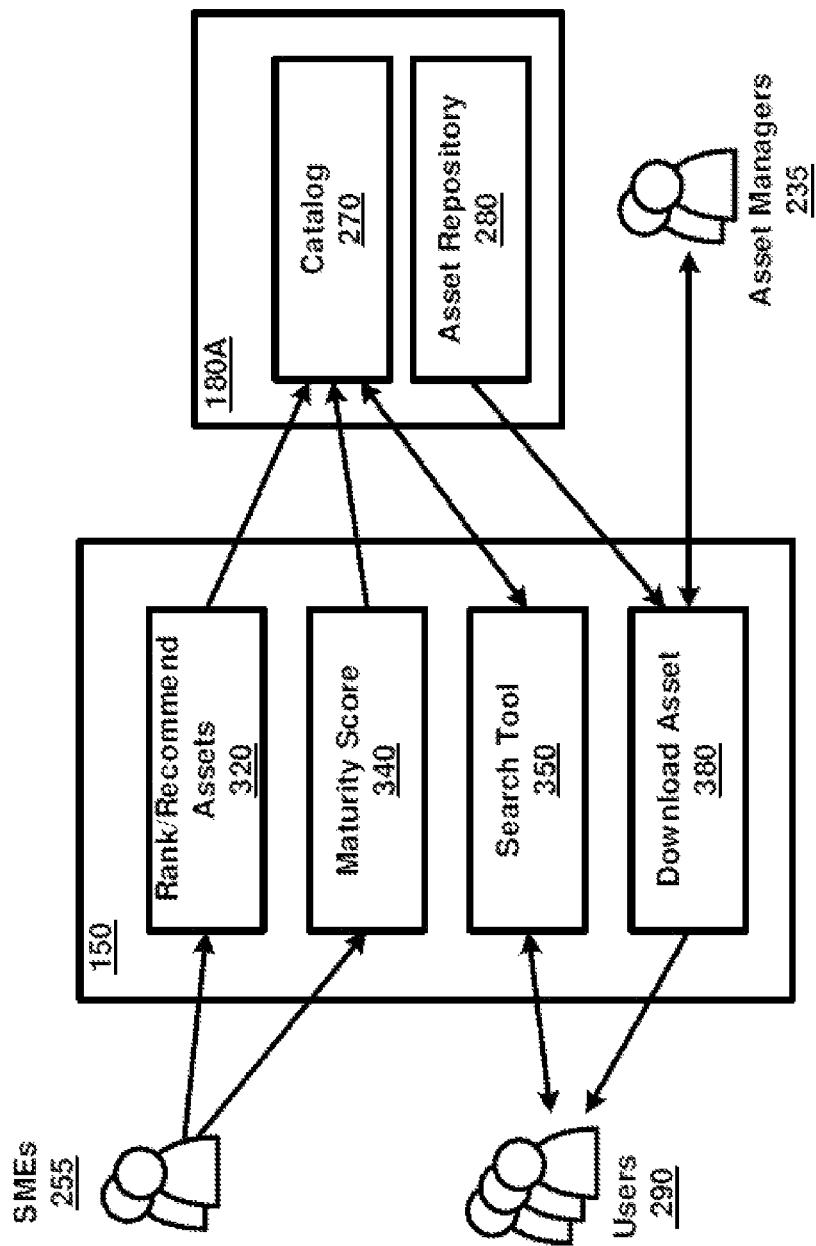
FIG. 3 is a block diagram illustrating the manner in which electronic assets (uploaded to asset repository) are searched and downloaded for reuse according to an aspect of the instant disclosure.

FIG. 3 illustrates the manner in which electronic assets (uploaded to asset repository 280) are searched and downloaded for reuse according to an aspect of the instant disclosure. Asset management system 150 includes various executable modules (in addition to those shown/described above) such as rank/recommend assets 320, maturity score block 340, search tool 350 and download asset 380. Each of the blocks/modules is described in detail below.

Rank/recommend assets 320 facilitates subject matter experts (SMEs) 255 to provide a ranking for each of the uploaded electronic assets in asset repository 280 and also to recommend specific electronic assets for each of the set of delivery phases. An SME may also recommend the specific uploaded asset to be used for a corresponding combination of delivery phase, asset type, technology and service line. Furthermore, the rankings may be provided in relation to all the uploaded assets or in relation to specific groups of assets (based on delivery phase, type, technology, etc.). Multiple rankings in relation to different groups/all assets may also be specified by the SMEs.

SMEs 255 may specify the rankings and recommendations using appropriate user interfaces provided by asset management system 150. Rank/recommend assets 320 may then update catalog 270 to indicate the ranking for each of the electronic assets and also which of the electronic assets in the asset repository is recommended for which of the set of delivery phases. Catalog 270 may also be updated to reflect the (group wise) rankings and (combination) recommendations specified by the SMEs.

Maturity score block 340 associates a maturity score with each of the electronic assets in asset repository 280, the maturity score indicating an order of preference of use of the assets. For example, usage of electronic assets associated with higher maturity scores may be preferred to usage of assets associated with lower maturity scores.

The maturity score to be associated with an electronic asset may be calculated in a known way. For instance, the electronic asset is evaluated according to multiple categories including, but not limited to, functionality, usability, benefit, reliability, patentability, etc. and category scores are assigned corresponding to the categories based on the evaluation. Maturity score block 340 then computes the maturity score of the electronic asset from the assigned category scores. The manner in which the maturity score of an electronic asset may be computed is described below with examples.

Figure 4:
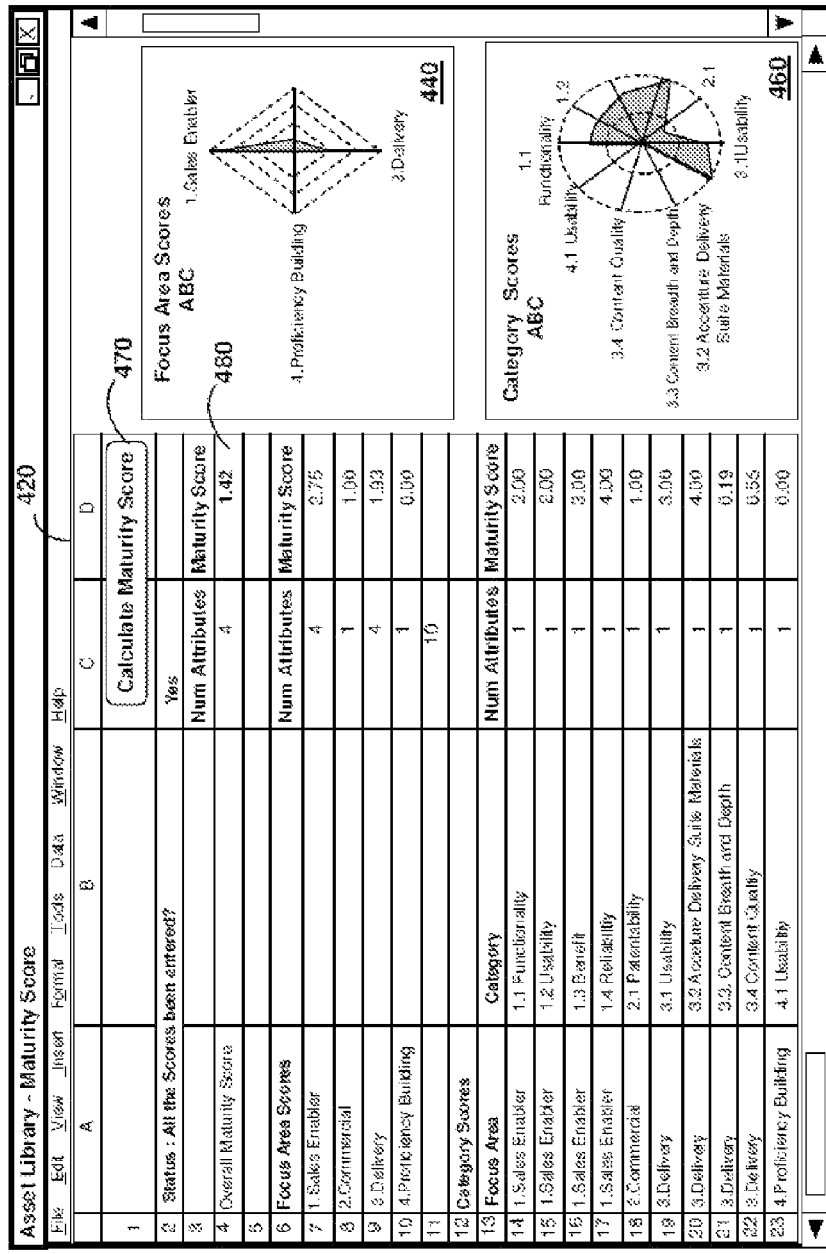
FIG. 4 depicts the manner in which a maturity score for an electronic asset is computed.

FIG. 4 depicts an example of the manner in which a maturity score for an electronic asset is computed. Broadly, one of SMEs 255 is provided a user interface for specifying scores to attributes related to various categories. The specified attribute scores are used to compute the corresponding category scores, which in turn are used to compute scores at focus area level and the final maturity score of the electronic asset.

Thus, display area 400 depicts a portion of a user interface (maturity assessment form) displayed to the SME. Display area 400 may be displayed on a display unit associated with the user system (160A-160N) used by the SME. The details of the electronic asset sought to be evaluated may also be provided in display area 400.

Display area 420 displays, in a tabular form, the various categories and also the specific focus areas (such as sales enabler, commercial, delivery, proficiency building, etc.) according to which the scores for the electronic asset are computed. A SME may assign desired scores to various attributes of each category (using a user interface similar to that shown in display area 400) and then click on button 470 for computation of the maturity score of the electronic asset.

In response, maturity score block 340 first computes category scores (as shown in column D, rows 14-23) based on the scores specified for corresponding attributes, then scores at focus area level (as shown in column D, rows 7-10) based on the computed category scores and then the final maturity score "1.42" (text 480) corresponding to the electronic asset based on the scores computed at the focus area level. Maturity score block 340 may also display graphs 440 and 460 to enable the SME to view the computed scores in a graphical manner.

Thus, maturity score block 340 computes the maturity score of the various electronic assets maintained in asset repository 280. Maturity score block 340 then updates catalog 270 to further indicate the maturity score associated the electronic assets in the asset repository.

Search tool 350 facilitates users 290 to search catalog 270 for electronic assets usable in a desired delivery phase (and/or based on combinations of asset type, technology, service line, etc.) and to identify a set of suitable electronic assets to be re-used. The users may then download the identified suitable assets from asset repository 280 and then use the suitable assets in delivering software services to different customers.

In some implementations, the search results also indicate the maturity score, the rankings, and a recommended indication for each of the identified suitable assets based on the information stored in catalog 270 by rank/recommend assets 320 and maturity score block 340. Users 290 are accordingly enabled to identify the set of suitable assets based on the maturity score, the rankings and the recommended indications. For example, a user may identify only the assets having high maturity scores, high ranking and a recommended indication as the suitable assets to be downloaded from asset repository 280. Thus, the identification of suitable assets is made more efficient/easier for users 290.

According to an aspect of the instant disclosure, search tool 350 enables users 290 to search for electronic assets using mind map techniques. A mind map refers to a graphical representation of words, ideas, tasks, or other items linked to each other, either directly or indirectly. A mind map is commonly used to generate, visualize, structure, and classify ideas, and as an aid to organizing information. The manner in which a user may search for electronic assets using mind map techniques is described below with examples.

Figure 5A:
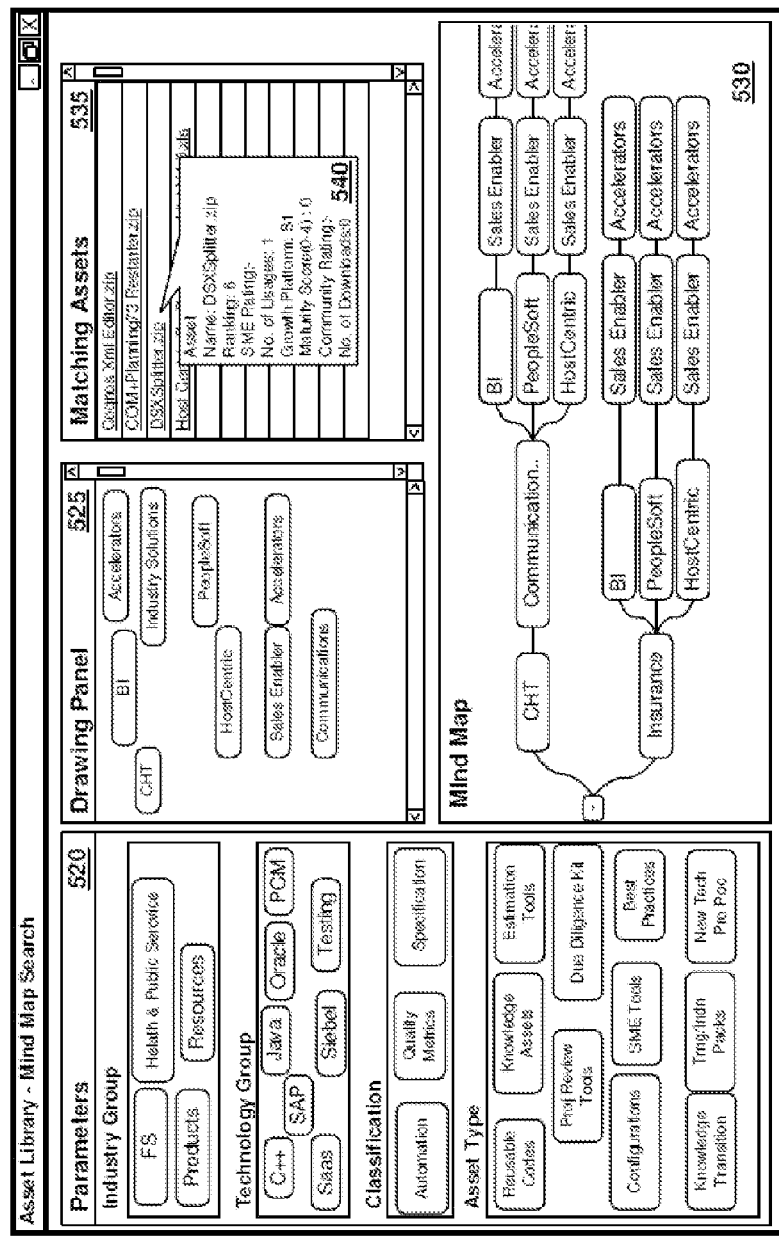
FIG. 5A depicts the manner in which users are enabled to search for electronic assets using mind map techniques.

FIG. 5A depicts an example of the manner in which users are enabled to search for electronic assets using mind map techniques. Display area 500 depicts a portion of a user interface displayed to a user in response to receiving a user request for searching for electronic assets. Display area 500 may be displayed on a display unit associated with the user system (160A-160N) used by the user for sending the user request.

Parameters panel 520 depicts the various parameters based on which searches for assets may be performed. The parameters are shown organized under groups such as category, technology, classification, etc. Each parameter is shown as a corresponding button labeled with the description of the parameter (e.g., "C++", "Reuse", "Application", "Industry Solutions", etc.)

Drawing panel 525 enables the user to add and remove parameters to the search request. For adding desired parameters, the user may drag and drop the corresponding parameter buttons from parameters panel 520 into drawing panel 525. The user may drag and drop the corresponding buttons out of drawing panel 540 (to outside the drawing panel) to remove some of the already added parameters. Other techniques, such as providing corresponding links/buttons, contextual menus, etc., may be provided to enable the user to add/remove the desired parameters.

In response to each user action, search tool 350 generates a mind map corresponding to the parameters present in drawing panel 525 and displays the generated mind map in mind map panel 530. Search tool 350 also identifies the set of assets matching the specified parameters and displays the search result in matching assets panel 535. The user may view the details of a specific matching asset by selecting (using a keyboard/mouse, or by hovering the mouse over) the asset, as indicated by display area 540.

Thus, a user is enabled to visually/graphically generate a mind map (in particular, the links/relationships) by dragging and dropping the desired parameters into drawing panel 525, as well as to view the corresponding matching results, thereby enabling the user to quickly/effectively find the suitable assets matching a desired criteria.

Other types of searches, for example, keyword based searches, may also be provided to enable users to identify suitable electronic assets. The manner in which a user may be enabled to perform a keyword based search is described below with examples.

FIG. 5B depicts an example the manner in which users are enabled to search for electronic assets based on keywords. Display area 550 depicts a portion of a user interface displayed to a user in response to receiving a user request for searching for electronic assets using keywords. Display area 550 may be displayed on a display unit associated with the user system (160A-160N) used by the user for sending the user request.

Display area 560 enables users to select the desired keywords/parameters using various input controls. A user may select the desired technology area (group, subtechnologyl, etc.), the application area, asset type, etc. and/or specify the specific names (or portions thereof) of the assets sought in a search. The user may then select "Search" button to send a search request (with the desired search options) to search tool 350.

Search tool 350 identifies the set of assets matching the specified search option and displays the search result in display area 570. In particular, the details of the matching assets are shown in the form of a table, with a "Technology Group" column 582, an "Asset Name" column 583, and an "Asset Type" column 584, which respectively specify the technology group, name and type of each of the matching assets. Column 588 specifies the maturity score (computed and stored by maturity score block 340) of each of the matching assets. Users also may access the maturity assessment form (as shown in display area 400) of each of the matching assets (for example, by clicking a link/icon provided alongside the maturity scores). Column 581 includes controls that allow a user to select which of the matching assets the user would like to download. The other columns specify the other relevant details (such as the ranking, recommendation, etc.) of the matching assets.

Referring back to FIG. 3, search tool 350 accordingly enables users to search for assets and determine the suitable assets for downloading from asset repository 280. Download asset block 380 enables users to download the desired ones of the suitable assets (identified based on the search of catalog 270) from asset repository 280 and to use the downloaded assets in delivering software services to various customers. Referring to FIG. 5B, a user may select the desired assets by selecting the corresponding checkboxes in the column 581 of display area 570, and then clicking or selecting the "Download" button to indicate that the selected assets are sought to be downloaded. In response to receiving the indication, download asset block 380 may retrieve the selected assets from asset repository 280 and then allow access to the retrieved assets to the user.

Download asset 380 also may monitor a corresponding number of assets downloaded by each of users 290 from asset repository 280. On determining that the corresponding number of assets downloaded by a user is more than a threshold (either pre-configured or user-defined) based on the monitoring, download asset block 380 notifies (e.g., sends emails) asset managers 235 of the number of assets downloaded by the user. Asset managers 235 may then perform corrective steps, for example, asking the user for a reason for downloading so many assets, sending a warning to the user, etc. in response to receiving the notification from download asset 380.

According to an aspect of the instant disclosure, asset managers 235 are enabled to tag some of the assets in asset repository 280 as restricted assets. Such tagging may be required for sensitive assets such as assets related to security, assets for performing financial transactions, etc. that are to be used only by authorized users. Download asset 380 notifies (one or more of) asset managers 235 (based on a configuration) in response to a user trying to download a restricted asset from asset repository 280. Download asset 380 may enable the user to download the restricted asset only on receiving an authorization from one or more of asset managers (235). Referring to FIG. 5B, search tool 350 may also display the "R" icon associated with specific assets that have been tagged as restricted assets, and accordingly download asset block 380 may require that such restricted assets that have been selected by the user (by clicking the corresponding check box) be first authorized by one or more of asset managers (235) before allowing the user to access the selected restricted assets.

Thus, asset management system 150 facilitates users of SSD organization 140 to search for assets in catalog 270, to download suitable assets from asset repository 280 and to use the downloaded assets during the various delivery phases of SSD. Once the users start re-using the assets maintained in asset repository 280, the effectiveness of reuse of the downloaded assets may be determined. The asset management system 150 also may identify the specific assets in asset repository 280 that need to be replaced/revised/retired (removed from reuse). The manner in which asset management system 150 facilitates the above noted objectives by tracking the reuse of assets is described below with examples.

4. Tracking Electronic Assets During Reuse

Figure 6:
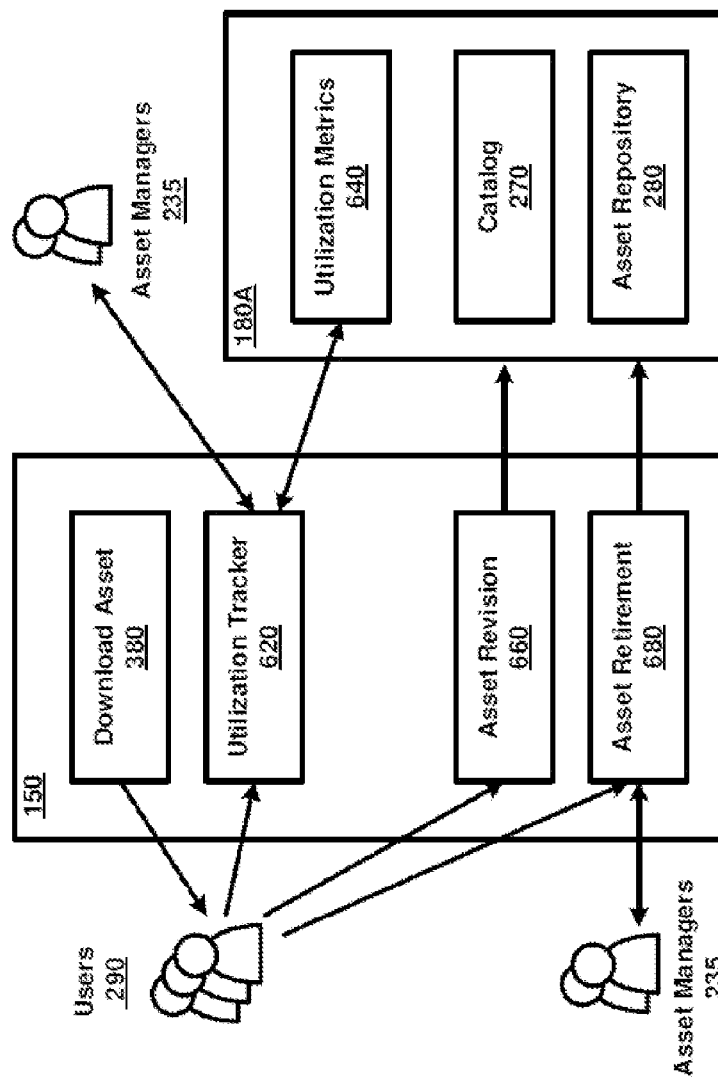
FIG. 6 is a block diagram illustrating the manner in which electronic assets are tracked during reuse according to an aspect of the instant disclosure.

FIG. 6 illustrates the manner in which electronic assets are tracked during reuse according to an aspect of the instant disclosure. Asset management system 150 includes executable modules (in addition to those shown/described above) such as utilization tracker 620, asset revision 660, and asset retirement 680. Each of the blocks/modules is described in detail below.

Users 290 are enabled to download a suitable electronic asset from asset repository 280 (using download asset 380, as described above) and to use the suitable electronic asset in delivering software services for various customers. Utilization tracker 620 receives from the users, usage data for the suitable electronic asset representing an extent of use of the suitable electronic asset in delivering software services and generates a set of utilization characteristics of the suitable electronic asset based on the usage data.

According to an aspect of the instant disclosure, download asset 380 is designed to send to a user a request for providing the usage data for the suitable electronic asset in response to determining that the user downloaded the suitable electronic asset a pre-configured/user-defined duration before the current time. Utilization tracker 620 may receive the usage data for the suitable electronic asset from the user as a response to the request, and then generate the utilization characteristics.

Utilization tracker 620 may store the generated utilization characteristics (and/or the received usage data) in utilization metrics 640 (provided within data store 180A). Utilization metrics 640 represents a non-volatile/persistent storage used to maintain the utilization characteristics (indicating the effectiveness of reuse) of the various assets downloaded from asset repository 280. In some examples, usage data represents a number of man-hours saved due to usage of the asset, with the corresponding generated utilization characteristic also representing a corresponding metric (the amount of dollars saved) computed based on the number.

Utilization tracker 620 is also designed to provide the generated utilization metrics (640) to one or more of asset managers 235 to enable the asset managers to determine the effectiveness of reuse of the assets downloaded from asset repository 280. The manner in which the utilization metrics may be provided to asset managers of SSD organization 140 is described below with examples.

FIG. 7 depicts an example of the manner in which utilization metrics of electronic assets is provided. Display area 700 depicts a portion of a user interface displayed to an asset manager (one of asset managers 235) in response to a request for the utilization metrics of electronic assets downloaded from asset repository 280. Display area 700 may be displayed on a display unit associated with the user system (160A-160N) used by the asset manager for sending the request.

Table 740 displays the utilization metrics for the various electronic assets downloaded from asset repository 280. In particular, a "Technology Area" column 761 and an "Asset Name" column 762 specify the technology group and the name of the asset, respectively. A "Project Name" column 763 indicates the projects in which the corresponding asset was/is being used, an "Effort Saved" column 764 indicates the man-hours saved in the corresponding project by reuse of the asset, and a "Dollars Saved" column 765 indicates the cost (in terms of amount of dollars) saved in the corresponding project.

The values in columns "Project Name" 763 and "Effort Saved" 764 may be received as part of the usage data from users 290, while the values in column 765 "Dollars Saved" may be generated as a utilization characteristic based on the corresponding values in columns 763 and 764. For example, the "Dollars Saved" values may be generated as a product of the corresponding man-hour values specified in column 764 and the hourly rate for each man-hour (determined based on the project specified in column 763).

Thus, asset managers (235) may view the effectiveness of reuse of the electronic assets downloaded from asset repository 280. The description is continued illustrating the manner in which the specific assets to be revised or retired are identified.

Referring back to FIG. 6, asset revision 660 is designed to receive from users 290 a request to add enhancements to a suitable electronic asset. The enhancements to be made may be determined during the usage of the suitable asset in delivering software services. The request may indicate the specific features sought to be added, removed or changed to the suitable electronic asset. In response to receiving the request, asset revision 660 implements (and tracks similar to development tracker 240) the requested enhancements to the suitable electronic asset to generate a modified electronic asset. On determining that the implementation of the modified electronic asset is complete, asset revision 660 uploads the modified electronic asset into asset repository 280 and archives the older version of the electronic asset, thereby ensuring the older version is replaced by the modified electronic asset. Asset revision 660 may update to indicate the revision operation performed on the suitable electronic asset.

Asset retirement 680 is designed to remove electronic assets from asset repository 280 in response to the determining that the assets are to be retired. For example, the specific electronic assets to be retired may be received as a corresponding request from one or more of users 290.

According to an aspect of the instant disclosure, asset retirement 680 is designed to examine catalog 270 and assets repository 280 to identify a list of electronic assets older than a pre-configured/user-specified duration, and to provide the list to one or more of asset managers 235. The list of assets may be provided using appropriate user interfaces to enable asset manager 235 to select the desired electronic assets to be retired from the provided list. Asset retirement 680 may then remove the selected electronic assets from asset repository 280. Asset retirement 680 may also notify users 290 of the removal of the electronic assets from asset repository 280.

The retired electronic assets may not necessarily be physically removed from asset repository 280 and the term "removal" merely implies that the removed assets can no longer be searched and/or downloaded (and therefore cannot be reused). In some examples, asset retirement 680 is designed to indicate the retired assets by setting a retired flag associated with each of the assets in catalog 270, with search tool 350 and download asset 380 designed to not include in the search/allow to download the assets whose corresponding retired flags are set in catalog 270.

Thus, asset management system 150 facilitates users of SSD organization 140 to track the usage of the electronic assets downloaded (for reuse) from asset repository 280. The tracking of the usage of the assets enables asset managers to determine the effectiveness of reuse of the downloaded assets. The tracking also facilitates the identification of the assets to be revised or retired in asset repository 280.

As noted above, one of the challenges to usage of electronic assets is to ensure that reuse of the assets by the users of SSD organization 140 is sustained. In other words, users may be encouraged to reuse assets maintained in asset repository 280, instead of building/creating the corresponding assets from scratch. The manner in which asset management system 150 facilitates the sustaining reuse of electronic assets in SSD organization 140 is described below with examples.

5. Sustaining Reuse pf Electronic Assets

Figure 8:
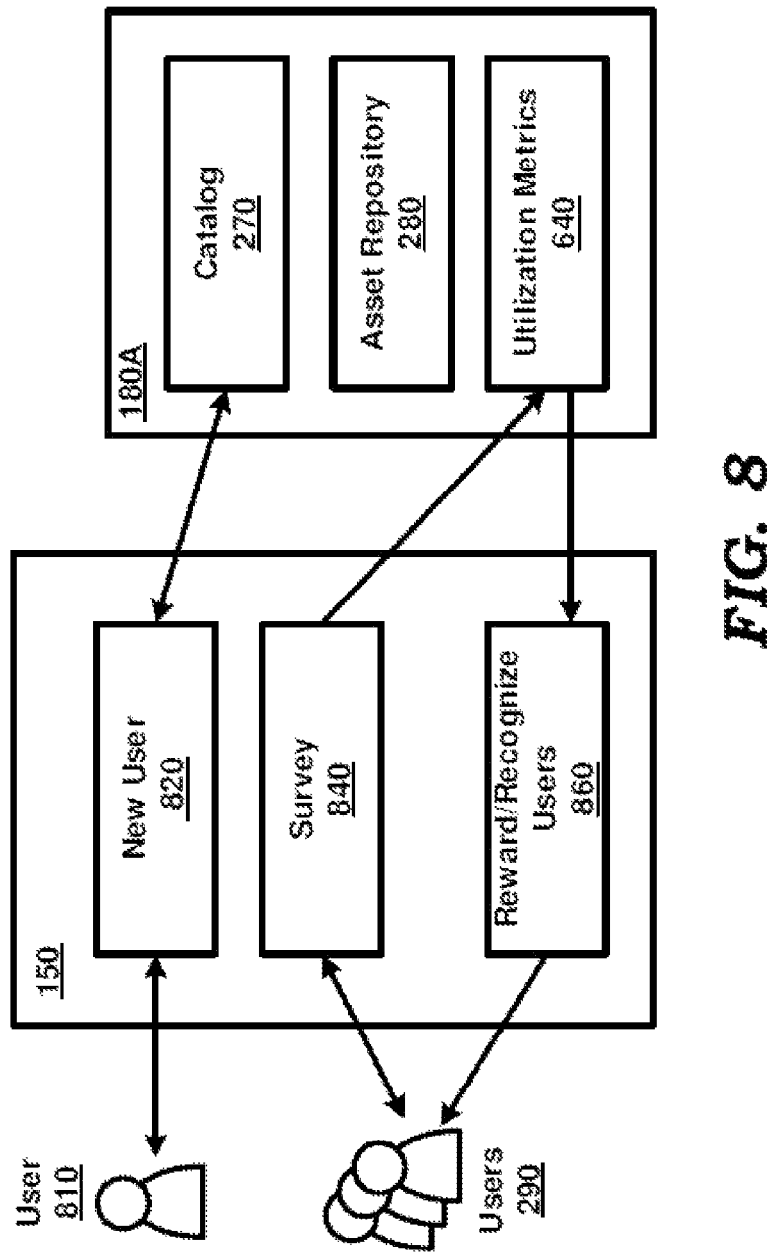
FIG. 8 is a block diagram illustrating the manner in which the reuse of electronic assets is sustained according to an aspect of the instant disclosure.

FIG. 8 illustrates an example of the manner in which the reuse of electronic assets is sustained according to an aspect of the instant disclosure. Asset management system 150 includes executable modules (in addition to those shown/ described above) such as new user 820, survey 840, and reward/recognize user 860. Each of the blocks/modules is described in detail below.

According to an aspect of the instant disclosure, the electronic assets uploaded to asset repository 280 are classified according to a set of technology areas in which the electronic asset is applicable. A catalog identifying which of the set of technology areas (for example, those shown in Table 3) to which each of the electronic assets in asset repository 280 is applicable is maintained, the catalog being consistent with the classification noted above.

In some implementations, such classification into technology areas shown in Table 3 is performed by classify and upload asset 260 of FIG. 2 along with the classification of each of the electronic assets (approved for inclusion in asset repository 280) received from asset review 250 according to a set of delivery phases in which the electronic asset is usable. Classify and upload asset 260 also updates catalog 270 to indicate the technology areas in which each of the electronic assets uploaded to asset repository 280 is applicable.

New user block 820 is designed to inspect the catalog (270) in response to identifying that user 810 of the enterprise (SSD organization 140) and a technology area in which the new user 820 is expected to operate in delivering software services. The identification of user 810 may occur when the user/employee is newly inducted into the SSD organization or when the user is new to (has not previously accessed the) asset management system. New user block 820 determines the electronic assets for the technology area based on inspection of the catalog (270) and then provides information on the determined assets to the user 810. The information on the determined assets may be provided along with other computer based trainings (CBTs) and/or induction/awareness programs illustrating the working of asset management system 150. The manner in which the determined assets (related to a technology group) may be provided to a new user is described below with examples.

FIG. 9 depicts an example of the manner in which assets related to a technology group (in which a new user is expected to operate) are provided to the new user. Although a user is shown as being provided only the assets of the technology area in which he/she is expected to operate, asset management system 150 does not restrict the user from accessing the assets of other technology areas as well. In general, a user may download any desired electronic assets for delivering software services that are not restricted.

Display area 900 depicts a portion of a user interface displayed to a new user (810) in response to identifying that the user is expected to operate in a specific technology area. Display area 900 may be displayed on a display unit associated with a user system (160A-160N) used by the new user. The description is continued assuming that display area 900 is displayed by new user block 820 in response to identifying user 810 (either newly inducted or new to the asset management system) and a technology area "BI (Business Intelligence)" in which user 810 is expected to operate in delivering software services.

In this example, text 920 indicates the technology area "BI", while display area 950 shows a list of recommend assets in the technology area "BI" in the form of a table. In particular, column 962 "Technology" specifies the technology area "BI" for each of the assets and columns 963 "Asset Name", 964 "Asset Category" and 968 "Maturity Score" respectively specify the name, the corresponding category and the corresponding maturity scores for each of the assets. The "R" icon shown associated with specific assets indicates that the specific assets are restricted assets. A user may select and download by selecting the corresponding check boxes shown in column 961 and then selecting the "Download" button.

Through the display area 900, new users are made aware of asset repository 280 and the specific electronic assets that are relevant to the technology areas they are operating in delivering software services. Accordingly, the reuse of the assets in asset repository 280 may be sustained by the new users.

Survey 840 is designed to conduct various surveys among users 290 on the asset management system as a whole and various assets present in asset repository 280. The surveys may be in the form of questionnaires inquiring with users 290, the specific assets that they wish to be developed and uploaded to asset repository 280, whether and how long do they search for assets, the number of assets that they prefer to be provided in the search results, etc. Survey 840 may update and/or add additional information to utilization metrics 640 based on the feedback provided by users 290 to the questionnaires. The conducting of such surveys among the users ensures that users are made aware of the asset management system and the electronic assets in asset repository 280.

Reward/recognize users block 860 is designed to examine the information in utilization metrics 640 and to identify the specific ones of users 290 who have to be rewarded and/or recognized for their contributions to the asset management system. For example, rewards/recognize users block 860 may identify the users (such as developers, asset managers, etc.) submitting the largest number of ideas that have been developed to assets, developing the largest number of assets, reviewing largest number of ideas, developing an asset which has continuously been ranked number one or been a recommended asset over a duration (such as a month, year, etc.), downloading and reusing the largest number of assets, saving the maximum effort (in terms of man-hours) and cost (in terms of dollars), etc.

The users so identified may be encouraged to continue usage of the asset management system by providing them with monetary rewards and/or organization/team-wide recognition (e.g., by sending emails to users 290). Such rewards and/or recognitions may also encourage other users of SSD organization 140 to further use the asset management system. Thus, asset management system 150 sustains reuse of electronic assets in SSD organization 140.

The features described above can be implemented in various implementations as a desired combination of one or more of hardware, executable modules, and firmware. The description is continued with respect to an example in which various features are operative when executable modules are executed.

6. Digital Processing System

Figure 10:
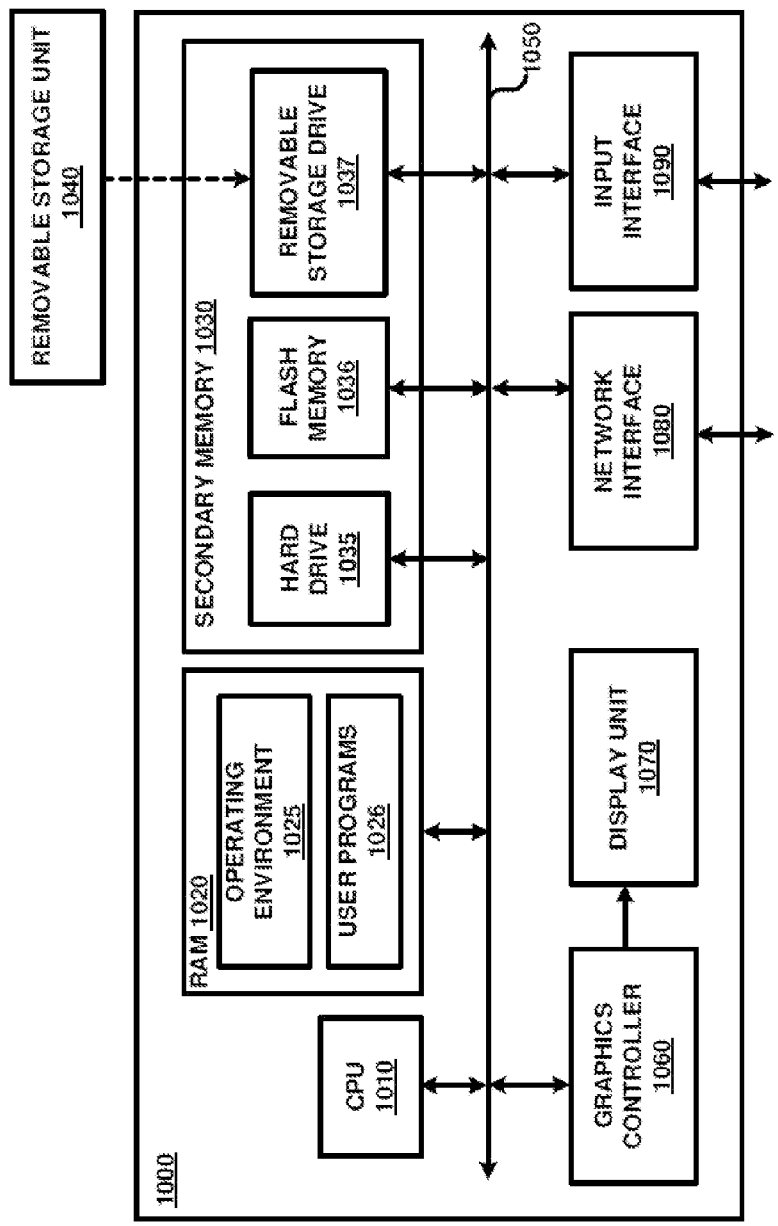
FIG. 10 is a block diagram illustrating the details of a digital processing system in which various aspects of the instant disclosure are operative by execution of appropriate executable modules.

FIG. 10 illustrates the details of digital processing system 1000 in which various aspects of the instant disclosure are operative by execution of appropriate executable modules. Digital processing system 1000 may correspond to one of user systems 160A-160N or to any system executing asset management system 150.

Digital processing system 1000 may contain one or more processors such as a central processing unit (CPU) 1010, random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the instant disclosure. CPU 1010 may contain multiple processing units, with each processing unit potentially being designed for a specific task. Alternatively, CPU 1010 may contain only a single general-purpose processing unit.

RAM 1020 may receive instructions from secondary memory 1030 using communication path 1050. RAM 1020 is shown currently containing software instructions constituting operating environment 1025 and/or other user programs 1026 (such as applications, web/application server software, RDBMS, etc.). In addition to operating environment 1025, RAM 1020 may contain other software programs such as device drivers, virtual machines, etc., which provide a (common) run time environment for execution of other/user programs.

Graphics controller 1060 generates display signals (e.g., in RGB format) to display unit 1070 based on data/instructions received from CPU 1010. Display unit 1070 contains a display screen to display the images defined by the display signals (for example, portions of the user interfaces shown in FIGS. 4, 5A, 5B, 7 and 9). Input interface 1090 may correspond to a keyboard and a pointing device (e.g., touch-pad, mouse) and may be used to provide inputs (for example, the category scores in FIG. 4, the drag and drop actions in FIG. 5A, and the search options in FIG. 5B). Network interface 1080 provides connectivity to a network (e.g., using Internet Protocol), and may be used to communicate with other systems connected to the network.

Secondary memory 1030 may contain hard drive 1035, flash memory 1036, and removable storage drive 1037. Secondary memory 1030 may store the data (for example, portions of catalog 270, electronic assets) and software instructions (for example, implementing the program logic of the executable modules shown in FIGS. 2, 3, 6 and 8), which enable digital processing system 1000 to provide several features in accordance with the instant disclosure.

Some or all of the data and instructions may be provided on removable storage unit 1040, and the data and instructions may be read and provided by removable storage drive 1037 to CPU 1010. Floppy drive, magnetic tape drive, CD-ROM drive, DVD Drive, Flash memory, removable memory chip (PCMCIA Card, EPROM) are examples of such removable storage drive 1037.

Removable storage unit 1040 may be implemented using medium and storage format compatible with removable storage drive 1037 such that removable storage drive 1037 can read the data and instructions. Thus, removable storage unit 1040 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1040 or hard disk installed in hard drive 1035. These computer program products provide software to digital processing system 1000. CPU 1010 may retrieve the software instructions, and execute the instructions to provide various features of the instant disclosure described above.

Furthermore, the described features, structures, or characteristics of the instant disclosure may be combined in any suitable manner in one or more implementations. In the above description, numerous specific details are provided such as examples of programming, software modules, user selections, network transactions, database queries, database structures, hardware modules, hardware circuits, hardware chips, etc., to provide a thorough understanding of implementations of the instant disclosure.

7. Conclusion

While various implementations of the instant disclosure have been described above, it should be understood that they have been presented by way of example only, and not limitation. Thus, the breadth and scope of the instant disclosure should not be limited by any of the above-described examples, but should be defined only in accordance with the following claims and their equivalents.

It should be understood that the figures and/or screen shots illustrated in the attachments highlighting the functionality and advantages of the instant disclosure are presented for example purposes only. The teachings of the instant disclosure are sufficiently flexible and configurable, such that techniques described may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the instant disclosure in any way.

What is claimed is:

1. A method of managing electronic assets in delivering software services, the method comprising:
    creating an electronic asset;
    uploading the electronic asset into an asset repository;
        enabling users to download the electronic asset from the asset repository and to use the electronic asset in delivering software services;
        receiving usage data for the electronic asset from a first user as a response to a request for the usage data for the electronic asset, the usage data representing an extent of use of the electronic asset in delivering software services for a particular project and an indication of the project;
        generating a set of utilization characteristics of the suitable electronic asset based on the usage data, the indication of the project, additional usage data of the electronic asset received for one or more other projects, and indications of the one or more other projects, the set of utilization characteristics indicating (i) that the electronic asset was utilized for the project and the one or more other projects and (ii) for each of the projects, savings provided by the electronic asset;
        determining that the electronic asset is suitable for delivering software services for a project of a second user;
        in response to determining that the electronic asset is suitable for delivering software services for a project of a second user, providing the set of utilization characteristics of the electronic asset for display to the second user; and
        subsequent to providing the set of utilization characteristics of the electronic asset, receiving a request from the second user to download the electronic asset.

2. The method of claim 1, further comprising:
    determining that the first user downloaded the electronic asset a duration before a current time instance; and
    sending, to the first user and in response to the determining, the request for providing the usage data for the electronic asset.

3. The method of claim 2, wherein receiving usage data for the electronic asset comprises receiving usage data that represents a number and generating the set of utilization characteristics comprises computing a corresponding metric based on the number.

4. The method claim 3, wherein receiving usage data that represents a number comprises receiving a number that represents a number of man-hours saved due to usage of the electronic asset.

5. The method of claim 1, further comprising:
receiving, from one or more of the users, a request to add enhancements to the electronic asset;
implementing the requested enhancements to the electronic asset to generate a modified electronic asset; and
uploading the modified electronic asset into the asset repository.

6. The method of claim 5, further comprising archiving the electronic asset to cause the electronic asset to be replaced by the modified electronic asset in the asset repository.

7. The method of claim 1, further comprising:
determining that the electronic asset is to be retired; and
removing the electronic asset from the asset repository in response to the determining.

8. The method of claim 7, wherein determining that the electronic asset is to be retired comprises determining that the electronic asset is to be retired based on receiving a request to retire the electronic asset from one or more of the users.

9. The method of claim 7, wherein determining that the electronic asset is to be retired further comprises:
examining the asset repository to identify a set of electronic assets older than a threshold duration, the set of electronic assets including the electronic asset;
enabling an asset manager to select desired ones of the set of electronic assets to be retired; and
determining that the electronic asset is to be retired in response to the asset manager selecting the electronic asset from the set of electronic assets.

10. The method of claim 7, further comprising notifying the users of the removing of the electronic asset from the asset repository.

11. An apparatus, comprising:
at least one processor;
at least one storage device having stored thereon instructions that, when executed by the at least one processor, causes the at least one processor to perform operations comprising:
creating an electronic asset;
uploading the electronic asset into an asset repository;
enabling users to download the electronic asset from the asset repository and to use the electronic asset in delivering software services;
receiving usage data for the electronic asset from a first user as a response to a request for the usage data for the electronic asset, the usage data representing an extent of use of the electronic asset in delivering software services for a particular project and an indication of the project;
generating a set of utilization characteristics of the electronic asset based on the usage data, the indication of the project, additional usage data of the electronic asset received for one or more other projects, and indications of the one or more other projects, the set of utilization characteristics indicating (i) that the electronic asset was utilized for the project and the one or more other projects and (ii) for each of the projects, savings provided by the electronic asset;
determining that the electronic asset is suitable for delivering software services for a project of a second user;
in response to determining that the electronic asset is suitable for delivering software services for a project of a second user, providing the set of utilization characteristics of the electronic asset for display to the second user; and
subsequent to providing the set of utilization characteristics of the electronic asset, receiving a request from the second user to download the electronic asset.

12. The apparatus of claim 11, the operations further comprising:
determining that the first user downloaded the electronic asset a duration before a current time instance; and
sending, to the first user and in response to the determining, the request for providing the usage data for the electronic asset.

13. The apparatus of claim 12, wherein receiving usage data for the electronic asset comprises receiving usage data that represents a number and generating the set of utilization characteristics comprises computing a corresponding metric based on the number.

14. The apparatus claim 13, wherein receiving usage data that represents a number comprises receiving a number that represents a number of man-hours saved due to usage of the electronic asset.

15. The apparatus of claim 11, the operations further comprising:
receiving, from one or more of the users, a request to add enhancements to the electronic asset;
implementing the requested enhancements to the electronic asset to generate a modified electronic asset; and
uploading the modified electronic asset into the asset repository.

16. The apparatus of claim 15, the operations further comprising archiving the electronic asset to cause the electronic asset to be replaced by the modified electronic asset in the asset repository.

17. A non-transitory computer-readable medium storing software comprising instructions executable by one or more computers which, upon such execution, cause the one or more computers to perform operations comprising:
creating an electronic asset;
uploading the electronic asset into an asset repository;
enabling users to download the electronic asset from the asset repository and to use the electronic asset in delivering software services;
receiving usage data for the electronic asset from a first user as a response to a request for the usage data for the electronic asset, the usage data representing an extent of use of the electronic asset in delivering software services for a particular project and an indication of the project;
generating a set of utilization characteristics of the electronic asset based on the usage data, the indication of the project, additional usage data of the electronic asset received for one or more other projects, and indications of the one or more other projects, the set of utilization characteristics indicating (i) that the electronic asset was utilized for the project and the one or more other projects and (ii) for each of the projects, savings provided by the electronic asset;
determining that the electronic asset is suitable for delivering software services for a project of a second user;
in response to determining that the electronic asset is suitable for delivering software services for a project of a second user, providing the set of utilization characteristics of the electronic asset for display to the second user; and subsequent to providing the set of utilization characteristics of the electronic asset, receiving a request from the second user to download the electronic asset.

18. The medium of claim 17, the operations further comprising:
determining that the first user downloaded the electronic asset a duration before a current time instance; and
sending, to the first user and in response to the determining, the request for providing the usage data for the electronic asset.

19. The medium of claim 18, wherein receiving usage data for the electronic asset comprises receiving usage data that represents a number and generating the set of utilization characteristics comprises computing a corresponding metric based on the number.

20. The medium claim 19, wherein receiving usage data that represents a number comprises receiving a number that represents a number of man-hours saved due to usage of the electronic asset.

* * * * *

UNITED STATES PATENT AND TRADEMARK OFFICE
CERTIFICATE OF CORRECTION

| | | |
|---|---|---|
| PATENT NO. | : 9,002,836 B2 | Page 1 of 1 |
| APPLICATION NO. | : 14/145146 | |
| DATED | : April 7, 2015 | |
| INVENTOR(S) | : Shreekant W. Shiralkar et al. | |

It is certified that error appears in the above-identified patent and that said Letters Patent is hereby corrected as shown below:

In the Claims

Column 20, Lines 40-41, Claim 1, after "the" delete "suitable".

Column 21, Line 4, Claim 4, after "method" insert --of--.

Column 22, Line 22, Claim 14, after "apparatus" insert --of--.

Column 23, Line 16, Claim 20, after "medium" insert --of--.

Signed and Sealed this
Third Day of November, 2015

Michelle K. Lee
*Director of the United States Patent and Trademark Office*